United States Patent [19]
Choi

[11] Patent Number: 4,843,464
[45] Date of Patent: Jun. 27, 1989

[54] DEVICE FOR AUTOMATIC SENSING OF TELEVIEWING DISTANCE

[75] Inventor: Hyun J. Choi, Kumi, Rep. of Korea
[73] Assignee: Gold Star Co., Ltd., Seoul, Rep. of Korea
[21] Appl. No.: 49,507
[22] Filed: May 14, 1987
[30] Foreign Application Priority Data
  May 15, 1986 [KR] Rep. of Korea ................ 6765/1986
[51] Int. Cl.$^4$ ............................................. H04N 5/00
[52] U.S. Cl. ................................ 358/112; 358/105; 358/108; 358/168; 358/190; 367/95
[58] Field of Search ............... 358/168, 190, 112, 108, 358/105, 93, 113; 367/93, 95; 340/540, 573, 541, 600

[56] References Cited

U.S. PATENT DOCUMENTS

| | | | |
|---|---|---|---|
| 3,164,673 | 1/1965 | Sharon | 358/168 |
| 3,165,582 | 1/1965 | Korda | 358/168 |
| 4,321,593 | 3/1982 | Ho | 358/190 |
| 4,641,191 | 2/1972 | Sutton | 358/168 |

Primary Examiner—Tommy P. Chin
Attorney, Agent, or Firm—Birch, Stewart, Kolasch & Birch

[57] ABSTRACT

An apparatus for automatically sensing televiewing distance to determine whether or not a televiewer is standing within a predetermined potentially harmful distance in front of a television set by making use of the elapsed time difference between an ultrasonic pulse generated and emitted from a transmitter located on the television set and which is then reflected from a televiewer located in front of the television set. The reflected pulse is then received by an ultrasonic wave receiver also located on the television set and in the event that the televiewer stands within the predetermined distance for a time longer than is required, for example, to make a manual adjustment to the television set, a signal is generated which deactivates the video portion of the television set until such time that the televiewer moves to a safe distance away from the set beyond the predetermined potentially harmful distance at which time the video portion is again reactivated.

9 Claims, 2 Drawing Sheets

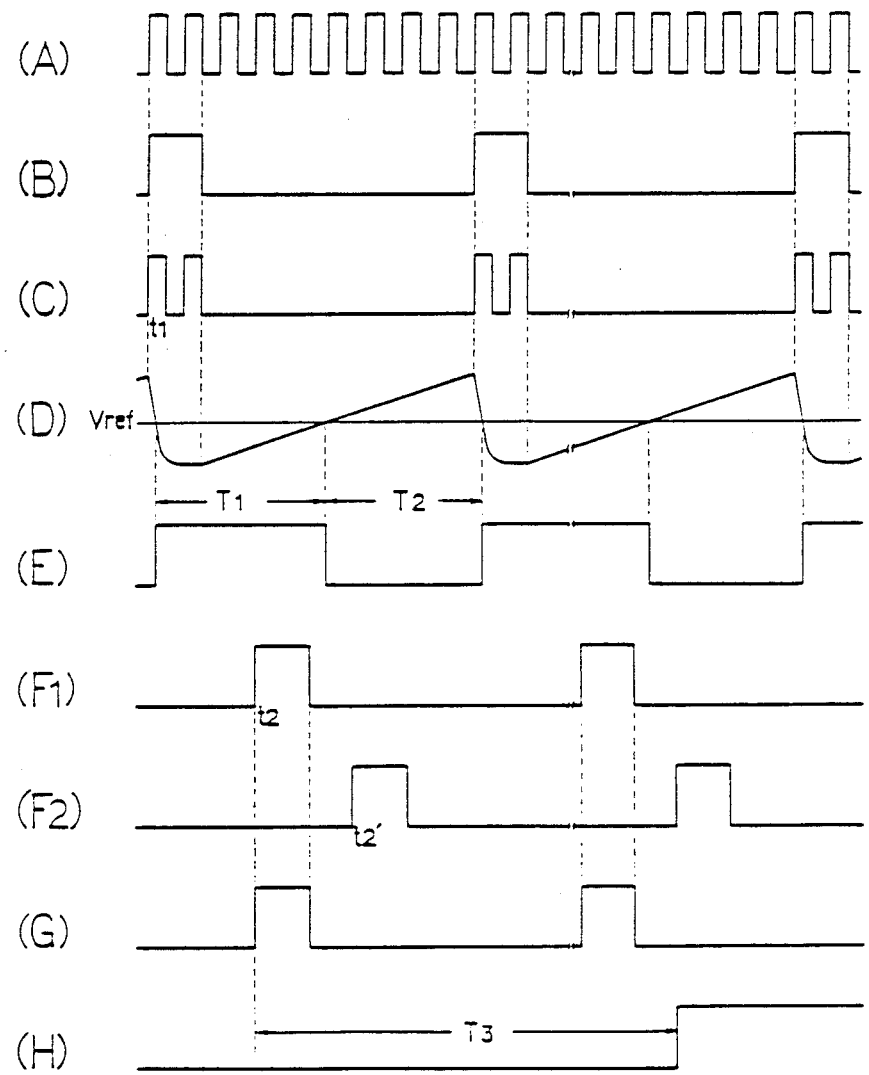
FIG,2

DEVICE FOR AUTOMATIC SENSING OF TELEVIEWING DISTANCE

BACKGROUND OF THE INVENTION

The invention relates to a device for the automatic sensing of televiewing distance, and in particular, it relates to a device for the automatic sensing of televiewing distance to sense when a televiewer is located within a given distance in front of the televison. It makes use of the time difference between the time ultrasonic waves emitted from ultrasonic wave transmitting means the television are reflected from an object located in the forward direction of the televison and the time thus the reflected ultrasonic waves are received by ultrasonic wave receiving means.

In general, when a televiewer watches a television set from a short distance in front of it, his eyesight is weakened by the ultraviolet rays produced from the picture on the television.

Therefore, it becomes desirable to detect whether or not a televiewer stays within a given distance in front of the television set, and to advise him that he should move backward a certain distance.

A conventional television, when equipped with ultrasonic transmitting and receiving means on its front face, emits ultrasonic waves from the ultrasonic wave transmitting means where they are reflected from an object located in front of the televison. The reflected waves are then received by the receiving means and a measure of the distance between the object and television is obtained from the intensity of the received waves. Accordingly, such apparatus has an inherent disadvantage in that the density of ultrasonic signals reflected from the object varies greatly depending on the physical properties of the object located in front of the television. Therefore, it is impossible to accurately measure the distance between the television and the object, and thus its reliability is reduced thereby.

OBJECTS OF THE INVENTION

The present invention was made in order to overcome the limitations of the prior art. It is the object of the invention therefore to provide apparatus for automatic sensing the televiewing distance so as to accurately measure the distance between a television set and an object located in front of the television regardless of the physical properties of the object.

Accordingly, this and other objects of the invention are obtained by making use of the constant velocity of transmission of ultrasonic waves, so that the time between the emission of ultrasonic waves from ultrasonic wave transmitting means and the receiving of the ultrasonic waves at receiving means after reflecting from an object is detected to provide a distance measurement between the television and the object.

BRIEF DESCRIPTION OF THE DRAWINGS

An embodiment and of the invention and its operation will now be described in detail, by way of example, with reference to the accompanying drawings. In the drawings, FIG. 2 is a set of the output wave forms helpful in describing the operation of FIG. 1.

BEST MODE OF CARRYING OUT THE INVENTION

Figure 1:
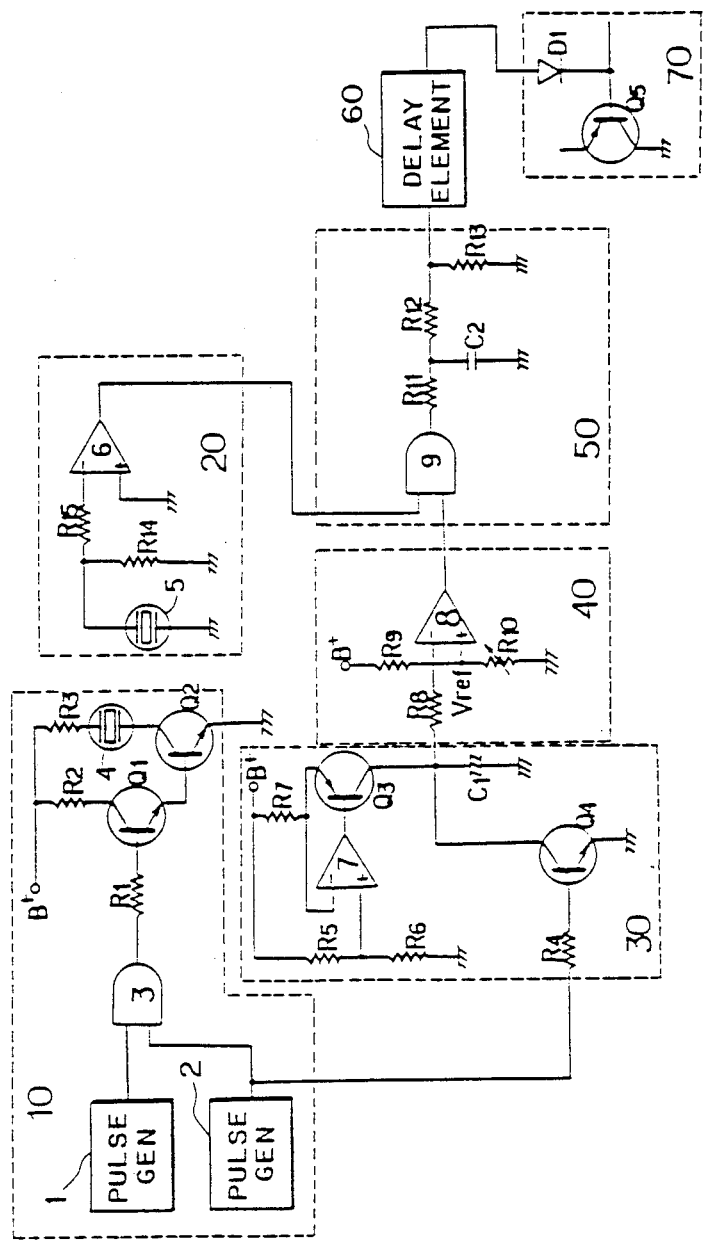
FIG. 1 is an electrical schematic circuit diagram of apparatus for automatically sensing televiewing distance according to the invention.

As is shown in FIG. 1, which is a circuit diagram of apparatus for the automatic sensing of televiewing distance according to the invention, an ultrasonic wave transmitter 10 is formed by connecting the output side of a pair of pulse oscillators 1 and 2, respectively generating the pulse signals of different periods, to the base of transistor $Q_1$ through an AND gate 3 and resistance $R_1$. The emitter of a transistor $Q_1$ is connected to the base of transistor $Q_2$, and an ultrasonic oscillator 4 is connected to the collector of transistor $Q_2$. An ultrasonic wave receiver 20 is formed by connecting a microphone 5 through which the ultrasonic waves are received, to resistance $R_{14}$ and at the same time to the inverse input terminal of the operational amplifier 6 through the resistance $R_{15}$.

Furthermore, a saw tooth signal generator 30 is formed first by connecting the collector of transistor $Q_3$, from which a constant supply voltage is applied to the emitter by resistance $R_7$. and the operational amplifier 7, to the condenser $C_1$ and the collector of transistor $Q_4$. The base of transistor $Q_4$ is connected to the output side of the pulse oscillator 2 of the ultrasonic wave transmitter 10 through the resistance $R_4$.

A square wave converter 40 is formed by connecting the output side of the saw tooth generator 30 to the inverse input terminal of a difference amplifier 8 through the resistance $R_8$. The circuit node between resistances $R_9$ and $R_{10}$ is connected to the non-inverting input terminal of the difference amplifier 8. A televiewing distance determining circuit 50 is formed by connecting the output side of the square wave converter 40 and the said ultrasonic wave receiver 20 to the input terminal of an AND gate 9. The output terminal of AND gate 9 is connected to the condenser $C_2$ through the resistance $R_{11}$, and is connected to the resistance $R_{13}$ through the resistance $R_{12}$. The output side of the televiewing distance determining circuit 50 is connected to the base of a video amplification transistor $Q_5$ of the video amplifying part 70 through signal delay element 60.

The operation of the invention will now be described in more detail.

The pulse oscillator 1 of the ultrasonic wave transmitter 10 generates pulse oscillation signals as shown in (A) of FIG. 2, and the pulse oscillator 2 generates pulse oscillation signals as shown in (B) of FIG. 2. Accordingly, pulses on the output side of AND gate 3 are fed out as the pulse signals as shown in (C) of FIG. 2. These pulse signals control the on and off states of the transistors $Q_1$ and $Q_2$ through the resistance $R_1$ so that the ultrasonic waves are generated by the ultrasonic oscillator 4 and transmitted from the television. Ultrasonic wves are reflected from the televiewer or object when he or it is located in front of the television, and received by the microphone 5 of the ultrasonic wave receiver 20.

Since the transmission speed of the ultrasonic waves is a constant velocity, i.e., the speed of sound (340 m/sec), the time from the moment the ultrasonic waves are transmitted to the reflecting body till the moment they are received by the ultrasonic wave receiver 20 is proportional to double the distance between the transmitter 10 the reflecting body. During this time, the oscillation signals generated by the pulse oscillator 2 of the transmitter 10 control the on and off states of the transistor $Q_4$ through the resistance $R_4$ of the saw tooth generator 30 so that constant saw tooth signals as shown in (D) of FIG. 2 are fed out of the output side of the saw tooth generator 30.

That is to say, in a state in which relatively low-potential signal is fed out of the pulse oscillator 2, the transistor $Q_4$ turns off causing the condenser $C_1$ to be charged with constant current supplied from a constant current supply source comprising resistances $R_5$ to $R_7$, operational amplifier 7 and transistor $Q_3$. The voltage across the condenser $C_1$ thereby rises, and when a state in which a relatively high-potential pulse signal is fed out of the pulse oscillator 2, the transistor $Q_4$ turns on so that the charging voltage of the condenser $C_1$ is discharged rapidly through the transistor $Q_4$. Thus a constant saw tooth signal as shown in (D) of FIG. 2 is generated on the output side of the saw tooth generator 30. The saw tooth signal fed out of the saw tooth generator 30 is now applied to the inverting input terminal of the difference amplifier 8 through the resistance $R_8$ where it is compared with a reference voltage Vref applied to its non-inverting input terminal. Accordingly, a square wave signal as shown in (E) of FIG. 2 is fed out of the output terminal of the difference amplifier 8. The high-level state time $T_1$ and the low-level state time $T_2$ of the square wave signal put out of the square wave converter 40 is determined by the reference voltage Vref established by the values of resistances $R_9$ and $R_{10}$.

The square wave signal out of the square wave converter 40, which is of constant period is applied to one input terminal the AND gate 9 of the televiewing distance determining circuit 50. When, for example a televiewer or a reflecting object is momentarily located in front of the television as described above, reflected ultrasonic signals are received by the microphone 5. The ultrasonic signals received are inverted and amplified in the operational amplifier 6, and then applied to the other input terminal of the AND gate 9 of the televiewing distance determining circuit 50. As described above, however, the transmission time from the moment the ultrasonic waves are emitted out of the ultrasonic wave transmitter 10, till the moment they are receiver by the ultrasonic wave receiving 20 is proportional to double the distance to the reflecting body so that the signal on the output side of the operational amplifier 6, is delayed with respect to the signal transmitted. In other words, the wave form ($F_1$) of FIG. 2 represents a case where a reflecting body is located at a short distance forward of the television, whereupon a pulse signal is fed out of the operational amplifier 6 with delay corresponding to the time $t_1$ and $t_2$ which proportional to the distance. The wave form ($F_2$) shown in FIG. 2 represents a case where a reflecting body is located at a great distance forward of the television, whereupon a pulse signal is fed out of the operational amplifier 6 with time delay $t_1$ to $t_2$.

Consequently, if a binary high-level pulse signal is, at the moment, fed out of the ultrasonic wave receiver 20 as shown in ($F_1$) of FIG. 2 during the time $T_1$, a high-level binary signal is fed out of the output terminal of the AND gate 9 as shown in (G) of FIG. 2, this high-level signal charges the condenser $C_2$ through the resistance $R_{11}$ so that a high-level signal is fed out of the televiewing distance determining circuit 50. However, in the event that the time the ultrasonic waves received by the ultrasonic wave receiver 20, are delayed longer than $T_1$, as shown in ($F_2$) of FIG. 2, and within the time $T_2$ wherein a low-level signal is fed out of the square wave converter 40, low-level signals are fed out continuously of the output terminal of the AND gate 9 and a low-level output signal appears on the output side of the circuit 50.

According to the above description, the binary state wherein a high-level signal appears on the output side of the televiewing distance determining circuit 50 comprises a condition where the reflecting body is located within a specified distance in front of the television.

The high-level output signal of the distance determining circuit 50 is applied to the delay element 60. Accordingly, when high-level signals are applied continuously to the input side of the delay element 60 for more than a given delay $T_3$, the delay element 60 puts out a high-level signal as shown in (H) of FIG. 2, and this high-level signal turns off the video amplification transistor $Q_5$ through the diode $D_1$ of the video amplifier section 70 of the television set so that no picture will be shown on the television. This lets the televiewer known that he stands within a specified harmful distance in front of the television.

When the televiewer, having sensed this fact, moves backward beyond this harmful distance in front of the televiion, low-level signals are, as described above, again fed out continuously from the output terminal of the AND gate 9 so that the charging voltage of the condenser $C_2$ is removed. A low-level signal is thereby fed out to the output side of the televiewing distance determining circuit 50. Consequently, a low-level binary signal appears on the output side of the delay element 60, and the video amplifier section 70 is again returned to an operative state.

In the above description, giving the televiewer time to manually operate the televison while seeing the picture shown on it, is the reason that the high-level signal is required on the ouput side of the delay element 60 for more than the time $T_3$.

It is possible, therefore according to the invention, to determine whether a televiewer stands within a harmful distance in front of the television, by making use of the elapsed time from the moment an ultrasonic signal is emitted, reflected and received to correctly sense the televiewing distance regardless of the intensity of ultrasonic waves reflected from the reflecting body.

What is claimed is:

1. Apparatus for automatically sensing the distance an object is located away from the front of a television set and deactivating the video portion of the television set when the object is within a predetermined close distance of the television set for a specified length of time, comprising:

an ultrasonic transmitter located on the television set and including circuit means for generating and transmitting ultrasonic pulse signals toward said object;

an ultrasonic receiver located on the television set and including circuit means for receiving and detecting said ultrasonic pulse signals transmitted from said transmitter and reflected from said object and generating an output pulse corresponding to the elapsed time between transmission and reception of said ultrasonic pulse signals, said output pulse being indicative of the distance between said object and said television set;

first circuit means coupled to and synchronized with the transmitter for generating an elapsed time signal of a predetermined signal width indicative of a predetermined close distance away from the television set;

second circuit means coupled to said receiver and said first circuit means and being responsive to said receiver output pulse and said elapsed time signal for providing a close distance output signal when said output pulse is present within said predetermined signal width; and third circuit means coupled to said second circuit means and being responsive to said close distance output signal to deactivate the video portion of the television set when a predetermined number of said close distance output signals occur within a predetermined time period.

2. The apparatus as defined by claim 1 wherein said first circuit means includes circuit means for generating a square wave of said predetermined signal width and one half of said square wave comprises said predetermined signal width.

3. The apparatus as defined by claim 1 wherein said first circuit means includes saw tooth output signal generator means coupled to said transmitter and being activated thereby upon the generation and transmission of said ultrasonic pulse signals and respectively generating a saw tooth output signal; and comparator circuit means having a first input coupled to a reference voltage and a second input coupled to said saw tooth output signal and providing a binary output waveform which changes state when the amplitude of said saw tooth output signal exceeds said reference voltage, and wherein one state of said binary output waveform comprises said elapsed time signal of predetermined signal width.

4. The apparatus as defined by claim 3 wherein said comparator circuit means comprises signal difference amplifier means providing an output of a first binary value when the amplitude of said saw tooth output signal is less than said reference voltage and of a second binary value when the amplitude of said saw tooth output signal exceeds said reference voltage.

5. The apparatus as defined by claim 4 wherein said second circuit means comprises coincidence circuit means having a first input coupled to the output of said signal difference amplifier means and a second input coupled to said output pulses of said receiver.

6. The apparatus as defined by claim 5 wherein said coincidence circuit means comprises a binary AND logic gate.

7. The apparatus as defined by claim 6 wherein said third circuit means comprises close distance output signal delay circuit means.

8. The apparatus as defined by claim 1 wherein said ultrasonic transmitter further comprises:

gated oscillator means for generating said ultrasonic pulse signals, a first pulse generator generating pulse signals of a first pulsewidth and a second pulse generator generating pulses of a second pulsewidth and wherein, said second pulsewidth is greater than said first pulsewidth, coincidence circuit means coupled to said pulses of first and second pulsewidths and generating an output signal for gating said gated oscillator means, and wherein said pulse of second pulsewidth is coupled to said first circuit means, said first circuit means being responsive thereto to generate said elapsed time signal of predetermined signal width.

9. The appaatus as defined by claim 8 wherein said coincidence circuit means comprises an AND logic gate.

* * * * *